(12) United States Patent
Rajvanshi et al.

(10) Patent No.: US 8,662,604 B2
(45) Date of Patent: Mar. 4, 2014

(54) METHOD AND APPARATUS FOR KNOCK OUT FEATURE IN BRITTLE MATERIAL

(75) Inventors: Rahul Rajvanshi, Irving, TX (US);
Jason Parkerson, Mansfield, TX (US);
Thomas W. Hawkins, Carrollton, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 251 days.

(21) Appl. No.: 13/110,078

(22) Filed: May 18, 2011

(65) Prior Publication Data

US 2011/0278060 A1    Nov. 17, 2011

Related U.S. Application Data

(63) Continuation-in-part of application No. 12/501,891, filed on Jul. 13, 2009, now abandoned.

(60) Provisional application No. 61/103,336, filed on Oct. 7, 2008.

(51) Int. Cl.
*A47B 81/00* (2006.01)

(52) U.S. Cl.
USPC ........................................ 312/223.1

(58) Field of Classification Search
USPC .......................... 312/223.1; 361/605
See application file for complete search history.

(56) References Cited

U.S. PATENT DOCUMENTS

| | | | |
|---|---|---|---|
| 4,025,747 A | 5/1977 | Bharteey | |
| 4,032,030 A | 6/1977 | Bass | |
| 4,296,740 A | 10/1981 | Meckler | |
| 4,825,339 A | 4/1989 | Boudon | |
| 4,962,443 A | 10/1990 | Cole | |
| 5,058,414 A | 10/1991 | Hayes | |
| 5,403,974 A | 4/1995 | Leach | |
| 5,462,169 A | 10/1995 | Dygert | |
| 5,892,195 A | 4/1999 | Aufermann | |
| 6,920,038 B2 | 7/2005 | Gehlbach | |
| 7,718,889 B2 | 5/2010 | Rasmussen | |
| 7,812,255 B2 * | 10/2010 | Garvin | 174/50 |
| 7,821,774 B2 | 10/2010 | Flowers | |
| 2004/0231875 A1 | 11/2004 | Rasmussen | |
| 2004/0240159 A1 | 12/2004 | Gehlbach | |
| 2007/0210679 A1 * | 9/2007 | Adducci et al. | 312/7.2 |
| 2009/0200273 A1 | 8/2009 | Flowers | |
| 2009/0212022 A1 | 8/2009 | Flowers | |
| 2010/0084188 A1 | 4/2010 | Hawkins | |

\* cited by examiner

*Primary Examiner* — Hanh V Tran

(57) ABSTRACT

A master electrical insulation barrier panel for use in a switchgear arrangement. The master electrical insulation barrier panel includes a plurality of optionally removable knock-out features, wherein each of the knock-out features has a peripheral edge. The peripheral edge includes a plurality of snapable tabs, wherein each snapable tab is separated by an opening configured to create a breakable weak link in a non-electrically conductive brittle material used for fabricating the master electrical insulation barrier wherein a weak link is associated with each of the optionally removable knock-out features. In addition, each of the optionally removable knock-out features corresponds to an optional opening for at least one possible electrical connection, such that at least one knock-out feature can be optionally removed from the master electrical insulation barrier panel during installation of the master electrical insulation barrier panel to create the optional opening for at least one electrical connection.

17 Claims, 7 Drawing Sheets

FIG. 7
FIG. 8
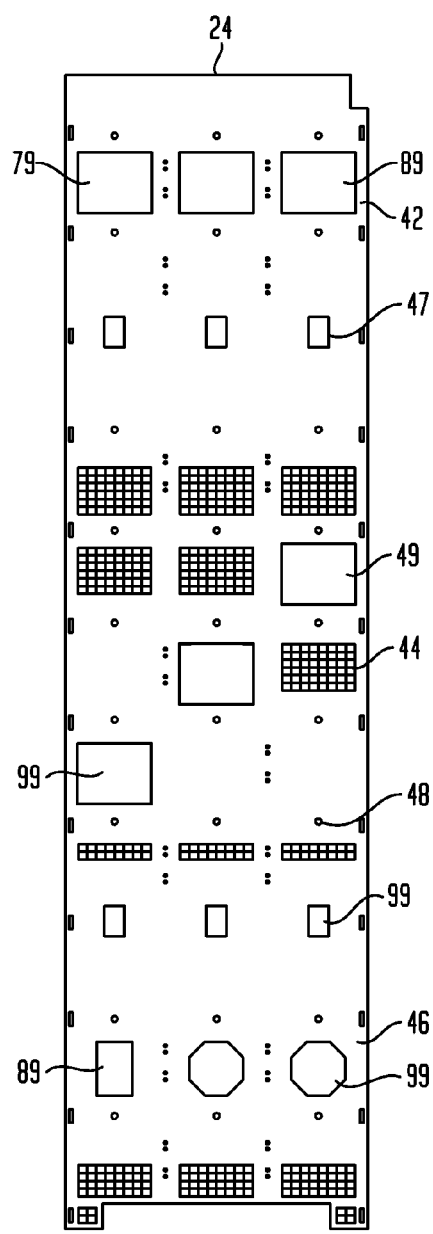
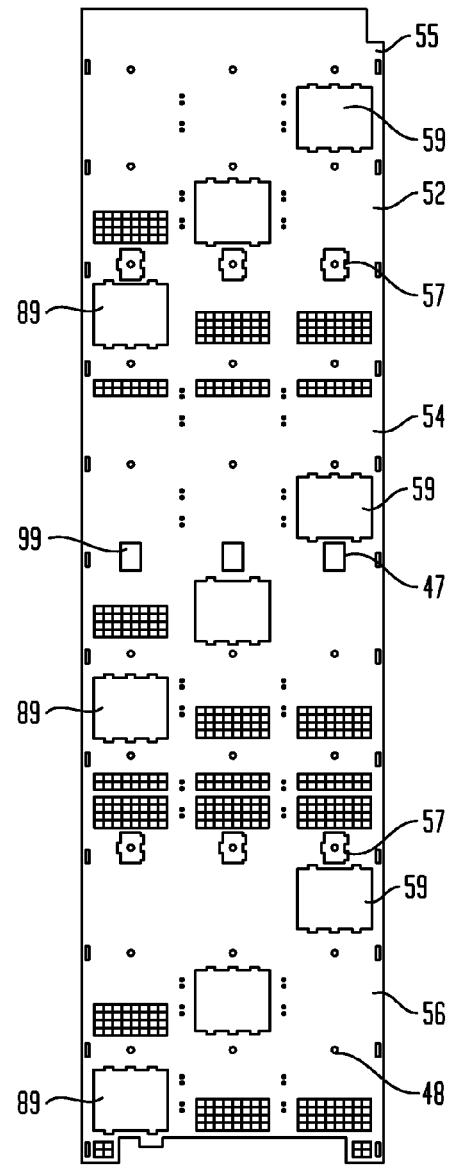

METHOD AND APPARATUS FOR KNOCK OUT FEATURE IN BRITTLE MATERIAL

CROSS-REFERENCE TO RELATED APPLICATIONS

This patent application is a Continuation-In-Part of pending U.S. patent application Ser. No. 12/501,891, filed on Jul. 13, 2009, which had claimed priority to and the benefit of U.S. Provisional Patent Application Ser. No. 61/103,336, filed on Oct. 7, 2008, entitled "Method For Knock Out Feature In Brittle Material," the entire disclosure of which is incorporated herein by reference.

FIELD OF THE INVENTION

The present invention relates generally to electrical insulation barriers. More particularly, the invention encompasses an electrical insulation barrier having knock-out features for an electronic apparatus. The electrical insulation barrier is preferably made from a brittle material, such as, for example, a thermoset insulating material, a glass reinforced polyester laminate material (such as, for example, GPO-1, GPO-2, GPO-3), and the like. The electrical insulation barrier is provided with a plurality of pre-defined knockout shapes that are knocked-out or removed as desired by a user.

BACKGROUND INFORMATION

Vertical electrical barriers, typically made from Glass Polyester Laminate, GPO 3, and the like, are used for insulating the vertical buss in each section. The barrier has slots for the horizontal branch busses and power connectors along with a series of vent openings.

The location of horizontal main bus and breakers in the section determines the slot requirements for power connectors and horizontal branch buses in the insulation barriers. To satisfy all the scenarios of these locations there are many different variations of these vertical wall insulation barriers.

Thus there is a need to consolidate these vertical wall insulation barriers by making knock-out features for power connectors and horizontal branch busses in a master part. Knocked-out features can be popped out in various combinations of power connectors and placement of horizontal branch busses to make multiple parts in the assembly line and on the field. Making a master part saves time in fabrication and logistics.

There are many applications for such an invention, such as, for example, switchgear, switchboards, to name a few. Switchgear and switchboard are general terms which cover metal enclosures, housing switching and interrupting devices, such as, fuses, circuit breakers, relays, along with associated control, instrumentation and metering devices, such as, bus bar, inner connections, and supporting structures, including, assemblies of these devices with associated buses, interconnections and supporting structures used for distribution of electric power.

There are High Voltage switchgear and switchboards, Medium Voltage switchgear and switchboards, and Low Voltage switchgear and switchboards.

Low voltage switchgear and switchboards operate at voltages up to about 635 volts, and with continuous currents that can exceed about 5000 amperes. These Low voltage switchgear and switchboards are designed to withstand short-circuit currents up to about 200,000 amperes.

Low voltage switchgear equipment typically comprises of an assembly composed of multiple metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses that extend through insulated openings in the rear wall of the breaker compartments. The vertical buses in each section are supplied with current by a horizontal main bus that runs through the line-up. The rear of the section is typically an open area for the routing of cables.

U.S. Pat. No. 4,032,030 (David L. Bass, et al.) the entire disclosure of which is incorporated herein by reference discloses a modifiable utility outlet box cover element formed of thin, metallic sheet material useable without modification in a substantially square form in closing a substantially square utility outlet box including slots through which screws may be passed into engagement with screw receiving means carried by such utility outlet box. The four corner portions of such utility outlet box cover element, two of which include such slots, are readily separable from the remainder thereof along slots cut deeply into one of the surfaces of such utility outlet box cover element; such remainder of such utility outlet box cover element being shaped and proportioned to close octagonally shaped or round utility outlet boxes and including knock-out portions which, when readily separated from the remainder of such utility outlet box cover element, provide openings through which screws may be passed into engagement with screw receiving means carried by such octagonal or round utility outlet boxes.

U.S. Pat. No. 4,296,740 (Milton Meckler) the entire disclosure of which is incorporated herein by reference discloses a modular system of solar insulation panels having sun tracking capability and adapted to be installed directly upon a roof structure and integrated with the surrounding roofing, and comprised of prismatic lenses embodied in a multiplicity of transparent tubes disposed in normal relation to the traverse plane of the sun, and arranged upon an insulation panel and with corner fittings and knock-out plugs to be employed as circumstances require.

U.S. Pat. No. 4,420,509 (David Barrell, et al.) the entire disclosure of which is incorporated herein by reference discloses a metal foil laminate including at least one sheet of metal foil directly bonded to one face of a sheet of glass fiber reinforced polyester resin, and a continuous process for preparing such laminates. The National Electrical Manufacturers Association (NEMA) has established standards for various base materials. Standards for polyester glass-mat sheet laminates have been established by NEMA, such as, grades GPO-1 GPO-2 and GPO-3.

U.S. Pat. No. 4,825,339 (Douglas M. Boudon, et al.) the entire disclosure of which is incorporated herein by reference discloses a knock-out in the wall of the housing for electronic equipment is selectively removed to provide a knock-out opening. A wall includes first and second slits positioned along the boundary of the knock-out and separated by a land. The wall includes a break out opening adjacent to each land. Break portions of the wall separate the break out opening from the first and second slits. These break portions are severed to interconnect the first and second slits through the break out opening and permit removal of the knock-out. Plural such slits and break out openings are provided and arranged to provide a knock out of rectangular or other desired geometric shape. The slits and break out openings are sized to provide electromagnetic interference shielding. Also, the break portions are of a length which is approximately no greater than the thickness of the wall and are positioned to facilitate removal of the knock-out without deforming the wall and without leaving burrs in the knock-out opening.

U.S. Pat. No. 5,058,414 (Fred M. Hayes) the entire disclosure of which is incorporated herein by reference discloses a method of removing electrical box knock-outs which includes utilizing a hand tool which has elongated jaws, one with a ring and the other with a punch directed toward the center of the ring. By positioning the jaws on opposite sides of a box wall and closing the jaws, the punch and ring close on the knock-out and the punch deflects the knock-out through the ring so that the knock-out can then be twisted and removed by needle nose pliers, for example.

U.S. Pat. No. 5,462,169 (Douglas M. Dygert, et al.) the entire disclosure of which is incorporated herein by reference discloses a novel composite package including a rectangular, outer, paperboard box and a rectangular, thin-walled, lightweight, molded plastic bottle within the box suitable for use with hazardous liquid materials. At its upper end, the bottle has a pouring spout adjacent its front wall and an elongated hollow handle extending from the pouring spout to the rear wall and defining an air passageway between the pouring spout and the liquid containing chamber within the bottle. A vent spout is provided at the rear of the hollow handle. The top flap assembly of the box includes knock-out flap portions which overlie the pouring spout, the hollow handle, and the vent spout, those knock-out portions being removable when it is desirable to pour liquid from the package. A pair of paperboard reinforcing pads are placed between the underside of the top flap assembly and the top of the plastic bottle, the pads enhancing the crush resistance and impact strength of the package.

US Patent Publication No. 20040127614 (Peijun Jiang, et al.) the entire disclosure of which is incorporated herein by reference discloses in paragraphs 599 to 601, a polyester-glass laminates, Grades GPO-1, GPO-2, and GPO-3 polyester glass-mat sheet laminates which are intended for both mechanical and electrical applications. In a specific example, the laminate article is formed in the following way: An adhesive composition is applied between a first layer and a second layer and between the second layer and a third layer to form a three layer laminate article, wherein the adhesive composition includes 95 percent by weight polymer and 5 percent by weight tackifier.

Thus there is a need for a master or a universal type electrical insulation barrier having knockout features for an electronic apparatus.

This invention overcomes the problems of the prior art and provides a novel method and an apparatus for electronic assemblies by providing a master or universal type electrical insulation barrier having knockout features for an electronic apparatus.

PURPOSES AND SUMMARY OF THE INVENTION

The invention is a novel method and an apparatus for electronic assemblies by providing a master or universal type electrical insulation barrier having knockout features for an electronic apparatus.

Therefore, one purpose of this invention is to provide a novel method and a master or universal type electrical insulation barrier having knockout features for an electronic apparatus.

Another purpose of this invention is to provide a master or universal type electrical insulation barrier having knockout features.

Yet another purpose of this invention is to use a brittle material to provide a master or universal type electrical insulation barrier having knockout features.

Still yet another purpose of this invention is to use a thermoset insulating material, or a glass reinforced polyester laminate material to provide a master or universal type electrical insulation barrier having knockout features.

Yet another purpose of this invention is to provide knockouts which may be easily and conveniently removed without requiring special tools.

Therefore, in one aspect this invention comprises an electrical insulation barrier, comprising an insulation panel, wherein said insulation panel has at least one knock-out feature.

In another aspect this invention comprises a method of forming knockout features in an electrical insulation panel, comprising the steps of:
(a) forming at least one layer of an electrical insulation panel;
(b) outlining said electrical insulation panel for at least one knockout location;
(c) forming a plurality of interrupted openings along said outline of said at least one outlined knockout location, and thereby forming said electrical insulation panel having at least one knock-out feature.

In yet another aspect this invention comprises a method of removing knockout features from an electrical insulation panel, comprising the steps of:
(a) forming at least one layer of an electrical insulation panel;
(b) outlining said electrical insulation panel for at least one knockout location;
(c) forming a plurality of interrupted openings along said outline of said at least one outlined knockout location,
(d) applying pressure along a portion of said outline such that said outlined knockout location separates from said electrical insulation panel and forms an opening for the passage of at least one electrical component, and thereby forming a method of removing said knockout feature from said electrical insulation panel.

BRIEF DESCRIPTION OF THE DRAWINGS

Although the scope of the present invention is much broader than any particular embodiment, a detailed description of the preferred embodiment follows together with drawings. The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 7 illustrates a vertical wall insulation barrier of this invention where several knockout features have been removed.

FIG. 8 illustrates a master vertical wall insulation barrier having knock-out features which is used to illustrate an embodiment of the present invention.

DETAILED DESCRIPTION OF THE INVENTION

This invention provides a method and apparatus for an improved electrical insulation panels. This invention further provides an electrical insulation barrier having knockout features for an electronic apparatus. This invention also provides a master or universal type electrical insulation barrier having knockout features for an electronic apparatus.

With this invention one gets a master electrical insulation barrier, such as, a glass polyester barrier, which can be used in multiple application by using the knockout features in the electrical insulation barrier.

It should be appreciated that the knock-outs in the electrical insulation barriers should be used or provided where slots or openings are needed for the intersecting parts.

The electrical insulation barrier is preferably used to insulate and/or isolate electrical conductors. With this invention a single master or universal type part can be made and used in many configurations and locations dependent on the design of the electronic apparatus. The invention allows for the creation of one or more opening in the electrical insulation barrier by knocking-out or removing one or more pre-defined shapes to allow clearance for intersecting electrical parts. With this invention one can consolidate many single use electrical insulation barriers into a few master parts that the user can customize to fit the application by removing the knockouts as desired. The present invention also relates to electrical insulation barrier for switchgear, panel boards, circuit breakers, and more particularly to electrical insulation barrier for low voltage switchgear and switchboard assemblies.

The standard metal-enclosed switchgear assembly has a rear insulation barrier that typically has pre-determined openings for an assortment of electrical and mechanical connections. These pre-determined openings are created in the rear insulation barrier white the rear insulation barrier is being manufactured. Due to a large number of possible design configurations many single use rear barriers are needed with these pre-determined openings. Thus, there is a need to have a rear insulation barrier that can be customized or modified in the field as demanded by the switchgear configuration.

Figure 1A:
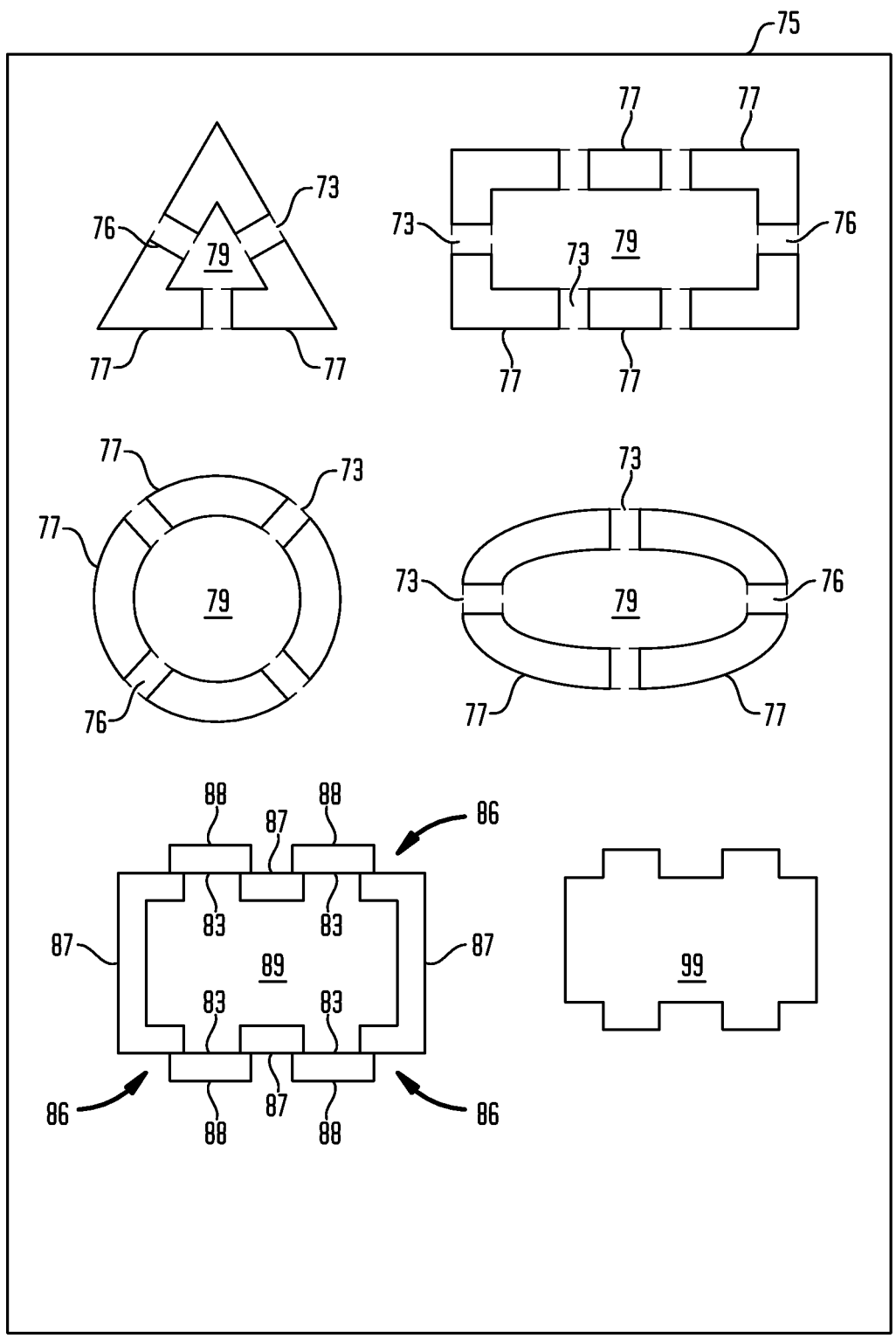
FIG. 1A illustrates an embodiment of an electrical insulation barrier sheet having at least one knockout feature of the present invention.

FIG. 1A illustrates an embodiment of an electrical insulation barrier sheet 75, having at least one knockout feature of the present invention. As shown in FIG. 1A, the electrical insulation barrier sheet or panel 75, has at least one knockout or cut-out 79. Knockout or cut-out 89, is a different type of a knockout than the knockout or cut-out 79, The knockout 79 has a plurality of tabs or lands 73, surrounded by a plurality of openings 77, or interrupted openings 77. With this arrangement when prying pressure is placed on the knockout 79, the tabs or lands 73, create a weak link or area 76, and the tabs or land 73, break or snap and the knockout 79, is then removed or pried out from the sheet or panel 75. One could also have a different types of knockouts, such as, the knock-out 89, that has a plurality of tabs or lands 83, surrounded by a plurality of openings 87. However, at the terminating end of the tab or land 83, one could have an opening 88, which creates a weak area or link 86. With this arrangement when prying pressure is placed on the knockout 89, the tabs or lands 83, the weak link or area 86, breaks or snaps and the knockout 89, can then be removed from the sheet or panel 75, creating an opening or slot 99. As one can see in FIG. 1A, that the tab area 83, has separated from the opening 88, and the opening 88, has merged into the opening 87, and thus creating the opening or slot 99. The shape for the knock-out feature could be selected from a group comprising a triangular shape 79, a rectangular shape 79, a circular shape 79, a polygonal shape 79, an odd shape 89, to name a few, which when removed would result in an opening or slot 99. It should be understood that when the opening 99 is created it mirrors the footprint of the knockout 79 or knockout 89 that is removed, thus a triangular knockout 79, would leave triangular opening 99, an elliptical knockout 79, would leave an elliptical opening 99, and so on and so forth.

Figure 1B:
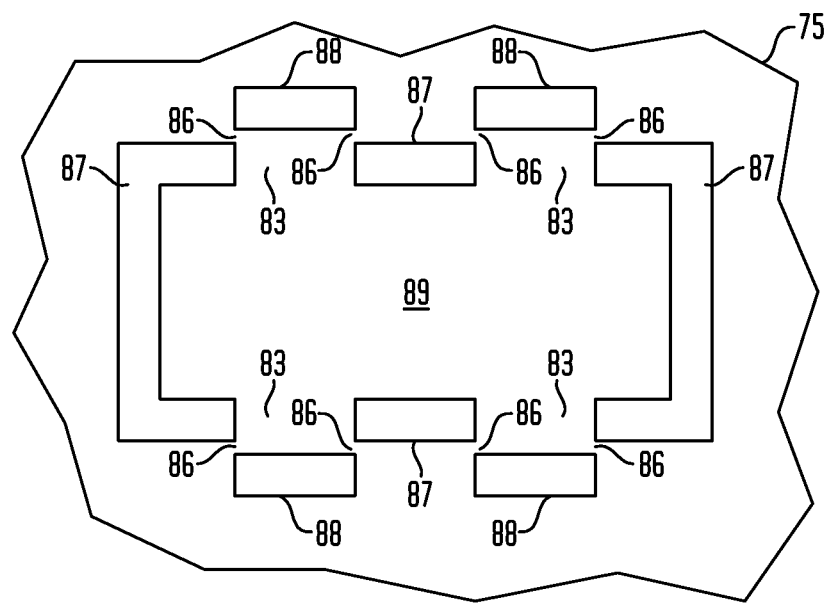
FIG. 1B illustrates an enlarged view of an embodiment of a knockout feature of the present invention.
Figure 1C:
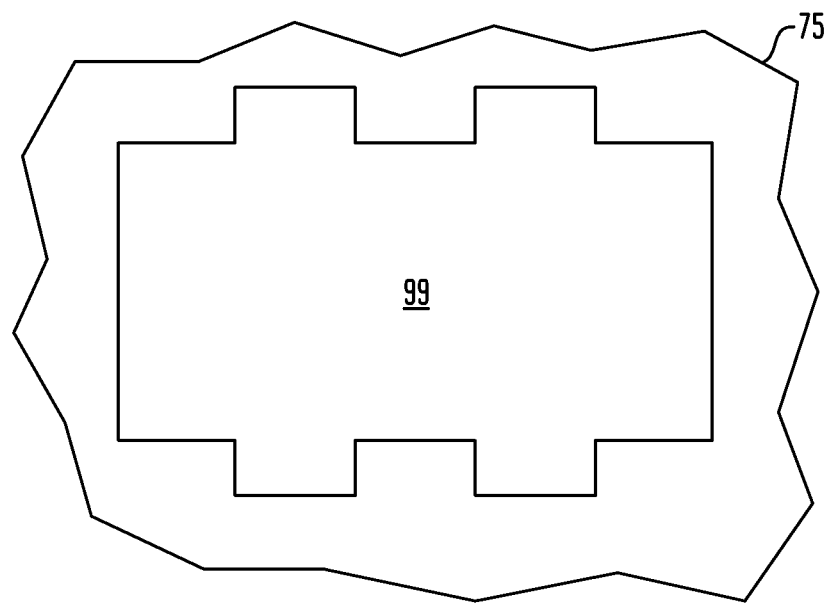
FIG. 1C illustrates an enlarged view of an embodiment of an electrical insulation barrier sheet with a knockout feature of the present invention removed.

FIG. 1B illustrates an enlarged view of an embodiment of a knockout 89, of the present invention. Whereas, FIG. 1C illustrates an enlarged view of an embodiment of an electrical insulation barrier sheet 75, with one of the knockout feature 89, of the present invention removed. The knockout 89, has a plurality of tabs or lands 83, surrounded by a plurality of openings 87. However, at the terminating end of the tab or land 83, one could have at least one opening 88, which creates at least one weak area or link 86. It is preferred that the weak are or link 86, is sufficiently close to the interrupted openings 87, 88, or serrations 87, 88, that when a knockout 89, is removed or pried out, burrs or jagged edges that project into the knock-out opening 99, are minimal, so as to create a substantially planer or smooth edge when the knock-out 89, is removed or pried out. Care should be taken when removing the knock-out 89, so that the wall or panel does not get damaged or deformed. With this arrangement when prying pressure is placed on the knockout 89, the tabs or lands 83, the weak link or area 86, breaks or snaps and the knockout 89, can then be removed from the sheet or panel 75, creating an opening or slot 99, as shown in FIG. 1A and FIG. 1C. As one can see in FIG. 1A and FIG. 1C, that the tab area 83, has separated from the opening 88, and the opening 88, has merged into the opening 87, and thus creating the opening or slot 99. For the purposes of illustration the knockout feature 89, has been shown to have been removed, however, one would gel a similar opening 99, if a knockout feature 79, were to be removed or pried out of the sheet or panel 75. It should be appreciated that the opening 99, is almost a mirror image of the knockout 89, and the openings 87 and 88.

With this invention the interrupted opening or serration should be spaced in such a way that when a knockout or cut-out is removed, burrs or jagged edges that project into the knock-out opening 99, are minimal, so as to create a substantially planer or smooth edge when the knock-out or cut-out is removed. Care should be taken when removing the knock-out or cut-out so that the wall or panel does not get damaged or deformed. It should be appreciated that the electrical insulation barrier panel or sheet 75, having knockouts 79, 89, are resistant to inadvertent removal upon impact. One of the inventive feature is that the punch pattern is designed such that any tear-out associated with break points of the material do not protrude or interfere with the imaginary perimeter line of the cut-out or knockouts. By the nature of this inventive design the cut-out or knockout contains features that are recessed back from the perimeter line but the exposed shape and size of the remaining hole(s)/serration(s) still conform with guidelines required for an insulating barrier.

Figure 2:
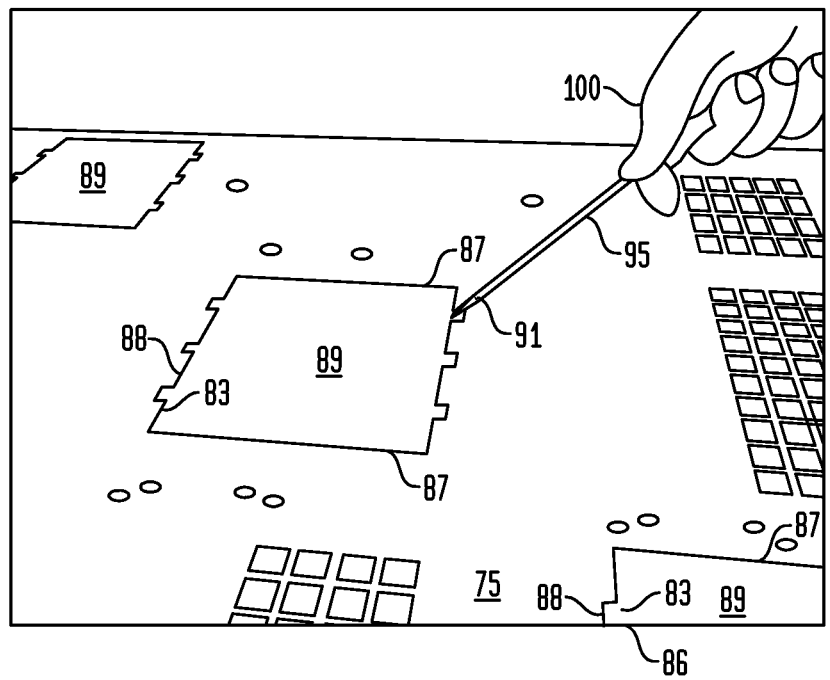
FIG. 2 illustrates an inventive electrical insulation barrier sheet having at least one knockout feature.

FIG. 2 illustrates an inventive electrical insulation barrier sheet having at least one knockout feature 89. As shown in FIG. 2, the electrical insulation barrier sheet or panel 75, has a plurality of knockouts 89. A user 100, preferably using a knockout tool 95, having a flat surface 91, inserts the flat surface 91, into the opening 87 or opening 88, and places a pressure on the edge of the knockout 89, so as to pry it out of the sheet or panel 75. The knockout tool 95, could be a screwdriver 95, having a flat surface 91, such as, a flat head 91.

Figure 3:
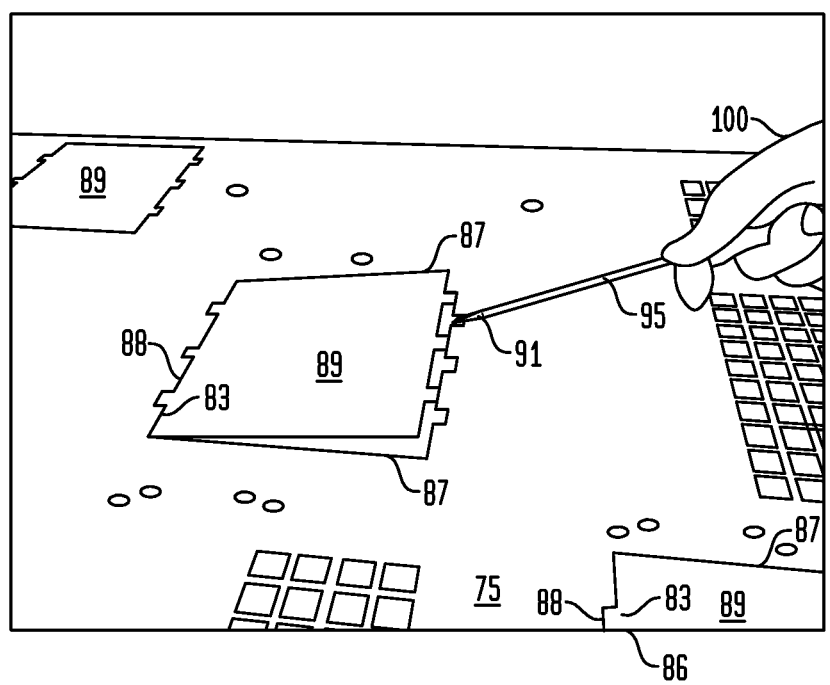
FIG. 3 illustrates a step of removing a knockout feature from the inventive electrical insulation barrier sheet of FIG. 2.

FIG. 3 illustrates a step of removing a knockout feature 89, from the inventive electrical insulation barrier sheet or panel 75, of FIG. 2. As one can see in FIG. 3, that the knockout 89, has been partially separated from the sheet or panel 75, creating an opening 99. The tab area 83, has separated from the opening 88, and the opening 88, has merged into the opening 87, and the opening 99 has thus been created.

For most applications when it is desired to remove the knockout 79, 89, out of electrical insulation barrier sheet 75, the flat blade 91, of a screwdriver 95, can be inserted into one of the breakout openings, such as opening 77, 87, 88. The screwdriver 95 is then rotated slightly to sever the break portions of wall between the slits or openings, and the weak area or link. Typically adjoining break portions of the wall are also simultaneously severed. The screw driver 95, can then be inserted into one or more other break out openings as required and rotated until the knock-out 79, 89, is free of the panel 75. Instead of using the break out openings for this purpose, a screwdriver may be inserted into the elongated slits or openings and twisted to remove the knock-out 79, 89. As one can see that with this invention the removal of the knockout is fast, convenient and easily accomplished and does not require any specialized tools.

However, there are several other methods of removing the knockout feature 79 or 89, from the electrical insulation barrier sheet 75, for example, one could insert the knockout tool 75, having a sharp edge 91, into the slot or opening 77, 87, 88 and the knockout could be pried out by moving the tool 95, in an angular motion. This action may need to be repeated if the knockout feature 79 or 89, has numerous break out points 73, 83. The knockout 79 or 89, could also be hit by a hammer or rubber mallet (not shown) to cause the knockout 79 or 89 to break away from the sheet or panel 75. One could also use a cutting tool (not shown), such as, a diagonal cutters, tin snips, to name a few, and is use it to cut the connecting land or tab 73, 83, between the sheet or panel 75, and the knockout 79 or 89. The knockout 79 or 89, to be removed could also be loaded into a press machine (not shown), such as, a pneumatic, hydraulic, mechanical, to name a few, with appropriate tooling to press and detach the knockout 79 or 89 from the sheet or panel 75. It should be understood by a person skilled in the art that any means to apply force or impact to the knockout area while property supporting the body of the sheet or panel 75, could be used to separate the knock-out 79 or 89, from the sheet or panel 75.

This inventive method and design can be used on fully enclosed knockout shapes, or knockout shapes that join with the edge of part to create a notch, or knockouts within knock outs, to name a few. Also, various knockout designs and shapes may be employed for the knockout feature itself. It should be understood that if a knockout is left in its original location or place, then this means that there is no need for an opening at that location. Additionally, the slits or openings around the perimeter of the knockout that is left in place preferably should be sufficiently small so as to provide proper electrical barrier characteristics. Furthermore, the knockout design of this invention has sufficient integrity to resist removal due to inadvertent impact, but it is easy to remove when desired without requiring special took.

Another innovative feature of this invention is the almost infinite ability to tune the strength of the knockout or cut-out without any tooling changes. The design of this invention incorporates an available punch size and allow the land 86, to be reduced or increased in size to weaken or strengthen the knockout portion simply by changing the punch x, y location during fabrication. This capitalizes on the nature of CNC punch presses that have limited available tools, but can provide very accurate and minute changes to the position of the punch.

The following example is provided to further illustrate the present invention and is not intended to limit the scope of the invention in any manner.

EXAMPLE

To further illustrate the invention an electrical insulation barrier sheet or panel 75, was manufactured and used in a switchgear assembly 23.

The rear barrier in a switchgear apparatus is used in conjunction with inner isolation barriers and side-wall barriers to insulate the vertical bus in a switchgear section. The power connectors are attached to the vertical buses and the horizontal buses. Short horizontal branch buses are typically provided where they run from the circuit breakers, which are in the front through the vertical bus and into the rear of the section. Therefore, the rear barrier must be provided with a multitude of openings for the power connectors and horizontal branch buses. Openings are also provided in the rear barrier, such as, for example, for screws, other hardware, to name a few.

The location of the horizontal main bus and the breakers in the section determines the number of the openings or slots requirements for the power connectors and the horizontal branch buses in the rear insulation barriers. To satisfy all the different configurations that might be needed at these locations one has to have many different variations of these vertical wall insulation barriers. With this invention one can now consolidate these rear barriers by making knock-out features for power connectors and horizontal branch busses in a master part. These knocked-out features can be popped or pried out in various combinations for the power connectors and for the placement of the horizontal branch busses. With this invention instead of assembling multiple parts in the assembly line and having them in the field one can now have a lesser number of master parts which can be adapted to the desired configuration either during assembly or in the field. With this invention having a master part saves time on fabrication and as well as it reduces time during assembly as well as repairs in the field.

Figure 4:
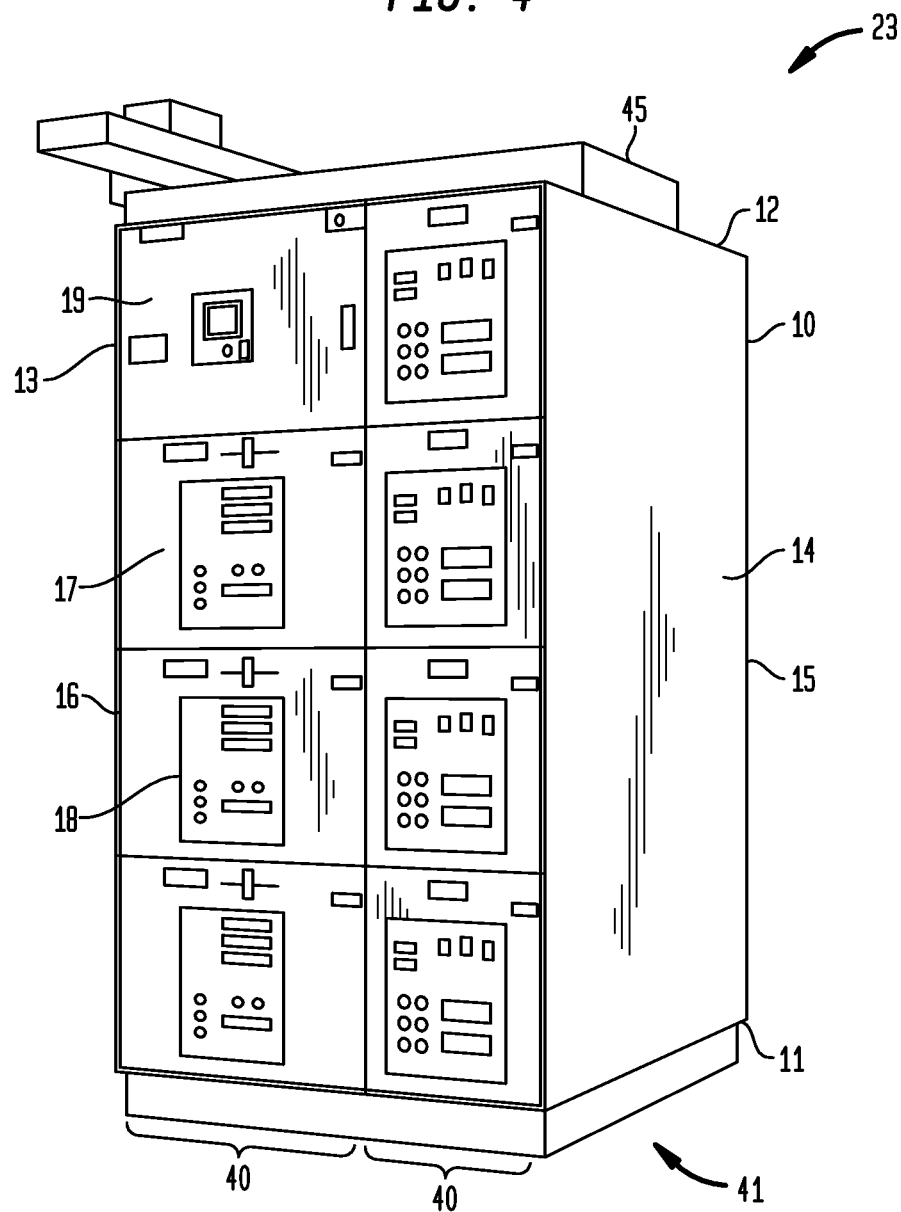
FIG. 4 is a novel switchgear assembly which is used to illustrate an embodiment of the present invention.

FIG. 4 is a novel switchgear assembly 23, which is used to illustrate an embodiment of the present invention. As shown in FIG. 4, the switchgear assembly 23, comprises of a plurality of switchgear sections 40. For some applications the switchgear section 40, may be assembled on at least one mounting base or sill channel 41. Each switchgear section 40, can contain up to six compartments 17, such as, a circuit breaker compartment 17, containing one circuit breaker 18, per each circuit breaker compartment 17. The switchgear assembly 23, further comprises of an enclosure or housing 10, which has a bottom or base 11, a top panel or cover 12, a first side panel or cover or wall 13, a second side panel or cover or wall 14, a back panel or cover 15, and a frontal panel or cover or assembly 16. For some applications the bottom or base 11, may have a bottom panel 11 or a base panel 11 or a floor plate 11. One or more of the compartments 17, may also contain electronic devices or electronic device modules 19. The switchgear assembly 23, is preferably provided with at least one ventilation means or structure 45, in the top panel or cover 12.

Figure 5:
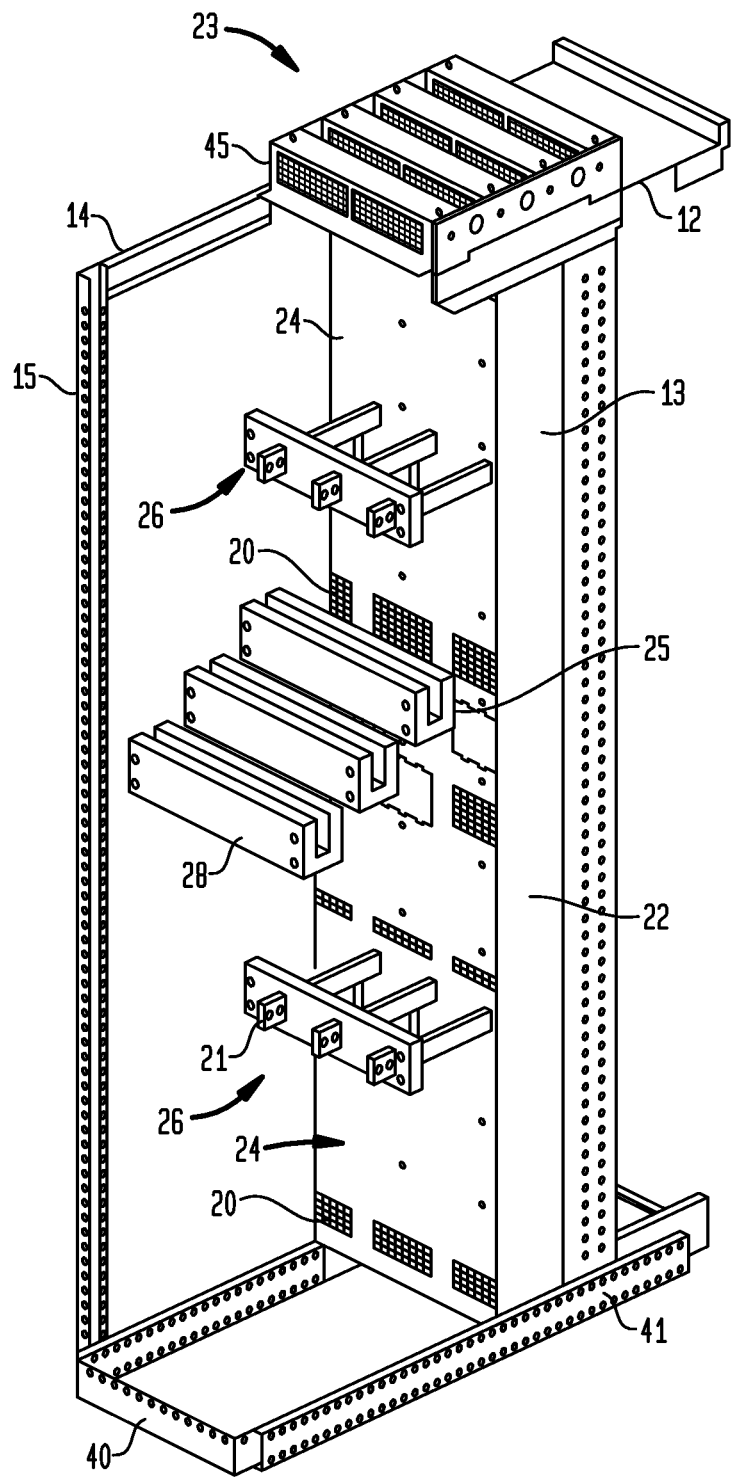
FIG. 5 illustrates a rear view of the novel switchgear assembly with housing covers removed to reveal a section bus compartment which is used to illustrate an embodiment of the present invention.

FIG. 5 illustrates a rear view of the novel switchgear assembly 23, with housing covers removed to reveal a section bus compartment 20, which is used to illustrate an embodiment of the present invention. The section bus compartment 20, is preferably enclosed by at least one insulation side barrier 22, and a vertical wall insulation barrier 24, with at least one knockout feature 79, 89. The section bus compartment 20, may also have one or more short horizontal branch bus 21, that extend through insulated openings 26, at least one horizontal main bus 28, and at least one power connector 25.

Figure 6:
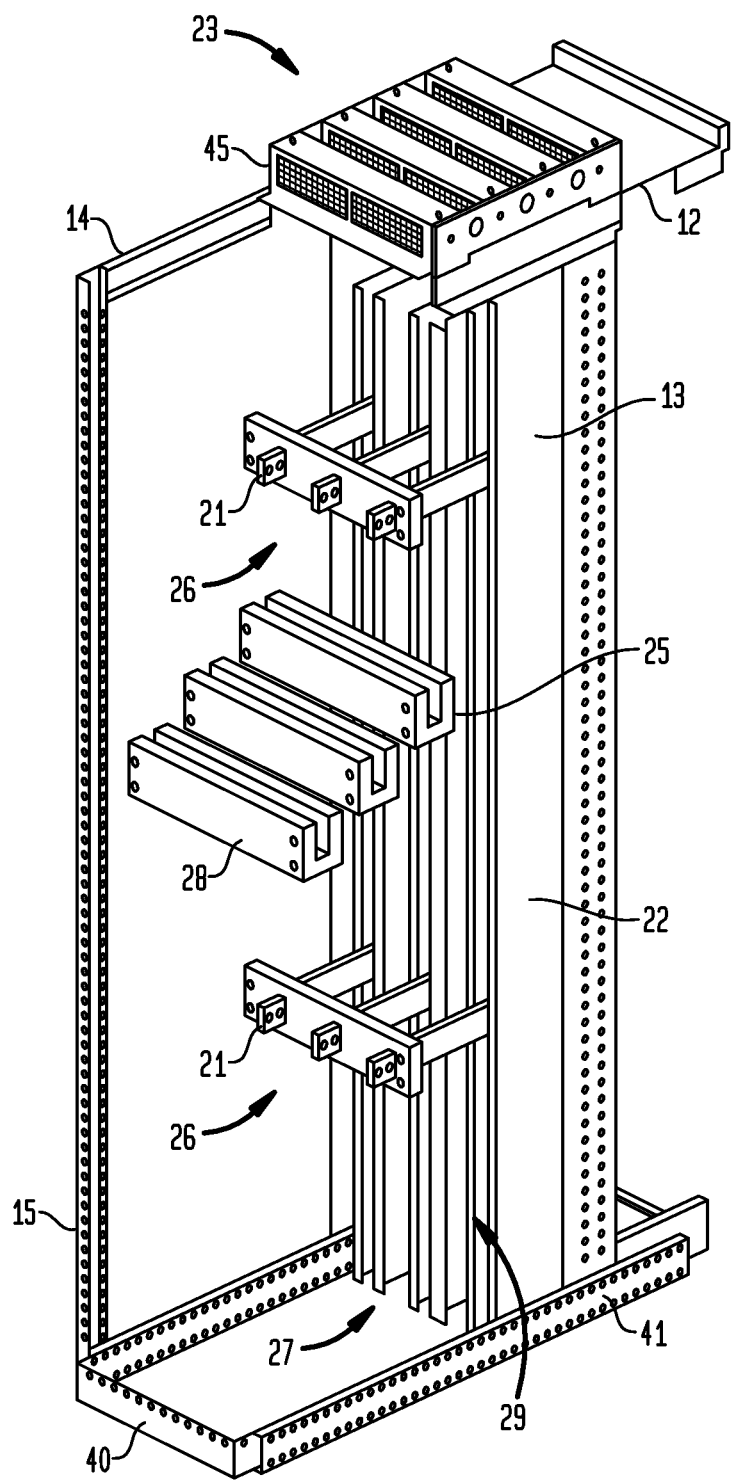
FIG. 6 illustrates a rear view of the novel switchgear assembly with the vertical wall insulation barrier removed to show at least one vertical bus to further illustrate the invention.

FIG. 6 illustrates a rear view of the novel switchgear assembly 23, with the vertical wall insulation barrier 24, removed to show at least one vertical bus 29, to further illustrate the invention. Also shown is an inner phase isolation barrier 27, that separate the section bus phases into at least one chamber, and preferably three separate chambers.

FIG. 7 illustrates a vertical wall insulation barrier 24 of this invention where several knockout features have been removed. The vertical wall insulation barrier 24, which is made from the electrical insulation barrier panel 75, comprises an upper vertical wall insulation barrier 42, a middle vertical wall insulation barrier 44, and a lower vertical wall insulation barrier 46. The vertical watt insulation barrier 24, may have one or more slots or openings 47, for horizontal branch buss 21, at least one slot or opening 49, for at least one power connectors 25, and at least one hardware hole, or opening or vent 48. The vertical wall insulation barrier 24, could be comprise of a single panel or it could comprise of several panels, such as, for example, the upper vertical wall insulation barrier 42, the middle vertical wall insulation barrier 44, and the lower vertical wall insulation barrier 46. As one can appreciate that the vertical wall insulation barrier 24, was formed from the master part 75 and where the knock outs not being used are left intact, white knockouts 79, 89, have been removed to create openings 47 and 49. The vertical wall insulation barrier 24 has both hardware holes 49, 99, as well as at least one slot or opening 47, 99, along with at least one opening or vent 48.

FIG. 8 illustrates a master vertical wall insulation barrier or panel 55, having knock-out features, which is used to illustrate an embodiment of the present invention. The vertical wall insulation barrier 55, which has been created from the electrical insulation barrier panel 75, comprises of an upper vertical wall insulation barrier 52, a middle vertical wall insulation barrier 54, and a lower vertical wall insulation barrier 56. The vertical wall insulation barrier 55, has at least one knock-out feature 57, 79, 89, for a horizontal branch buss 28, and at least one knock-out feature 59, 79, 89, for at least one power connector 25. The vertical wall insulation barrier 55, could be comprise of a single panel or it could comprise of several panels, such as, for example, the upper vertical wall insulation barrier 52, the middle vertical wall insulation barrier 54, and the lower vertical wall insulation barrier 56. As one can see in FIG. 8, that the insulation barrier or panel 55, has a plurality of knock-out features 47, 57 and 59, and these knock-out features 57 and 59, can be knocked-out as needed which gives this single insulation barrier or panel 55, a large number of possible design configurations, whereas in the past many single use rear barriers were needed with pre-determined openings for each application. As one can see that the master electrical insulation barrier sheet 75, has been configured into a vertical wall insulation barriers 55 for a specific apparatus and application by removing the knock outs features 47, 57 and 59 at the desired locations while the other knockouts 47, 57, 59, 79, 89, in the sheet or panel 75, 55, have been left intact.

As stated earlier that these knock-out features of this invention can be knocked-out or removed as needed. For example, the same upper vertical wall insulation barrier 52, can be used when there is a need to have an opening for power connector 25, and the slot or slots for the power connector 25, can be simple created by knocking-out or removing the knock-out feature 59, for the power connector 25. Similarly, the same upper vertical wall insulation barrier 52, can be used when there is a need to have an opening for at least one horizontal branch buss 21, and where the slot or slots for the horizontal branch buss 21, can be created simply by knocking-out the knock-out feature 57, for the horizontal branch buss 21. Thus for some applications the same upper vertical wall insulation barrier 52, can be used for both the power connector 25, and the horizontal branch buss 21, by knocking-out both the knock-out features 57 and 59. Thus with one vertical wall insulation barrier 55, one can have a master part or a universal part 75 that can be used in multiple scenarios and applications.

The electrical insulation barrier panel or sheet 75, is preferably selected from a group comprising of a brittle material, a thermoset insulating material, a glass reinforced polyester laminate material, to name a few. A brittle material is defined as a material that is liable to fracture when subjected to stress, i.e., it has a little tendency to deform (or strain) before fracture. A brittle material usually fails in tension rather than shear and there is little or no evidence of plastic deformation before failure. When a brittle material has reached the limits of its strength, it usually either deforms or fractures.

The inventive knock-out features in the electrical insulation barrier panel or sheet 75, could be made for a horizontal branch bus, a power connector, to name a few. The inventive knock-out features could be formed by a plurality of serrations around the periphery of the knock-out feature, or they could be formed by a weakened area around the periphery of the knock-out feature, or they could be formed by forming a plurality of interrupted openings around the periphery of the knockout feature. These knock-out features could also be formed by having a notch around the periphery of the knock-out feature or could be formed by a plurality of discrete connections around the periphery of the knock-out feature and the electrical insulation barrier panel or sheet 75. The shape for the knock-out feature could be selected from a group comprising a triangular shape, a rectangular shape, a circular shape, a polygonal shape, an odd shape, to name a few.

As one can now appreciate that this method of creating a knockout in a brittle composite material has many uses beyond the switchgear barriers. One could use this invention and the method in any panel or part that needs an opening based on the configuration of surrounding parts. As stated earlier that with this invention one could have a master panel or part, and since the master panel or part contains a multitude of knockout features and is shaped to fit various locations in the assembly, the assembly technician or user can create the correct barrier for the situation that they encounter. First, the user would determine where an opening is required in the barrier by observing the locations of the intersecting parts or where an opening is needed. Next, they would need to remove the knockout feature to create the opening. And, with these simple steps one would removing the knockout feature to create an opening in the part to allow passage of an intersecting part or any other part that is needed to pass through the electrical insulation panel 75.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A master electrical insulation barrier panel, comprising a plurality of optionally removable knock-out features, wherein each of said knock-out features has a shape defined by a peripheral edge to provide a plurality of knock-out features each having a different shape, wherein said peripheral edge comprises a plurality of snapable tabs, and wherein each snapable tab is separated by an opening configured to create a breakable weak link in a non-electrically conductive brittle material used for fabricating said master electrical insulation barrier wherein a weak link is associated with each of said optionally removable knock-out features, and wherein each of said optionally removable knock-out features corresponds to an optional opening for at least one possible electrical connection, such that at least one knock-out feature can be optionally removed from said master electrical insulation barrier panel during installation of said master electrical insulation barrier panel to create said optional opening for at least one of said electrical connection, and whereby said master electrical insulation barrier panel can be used in multiple scenarios and applications.

2. The master electrical insulation barrier panel of claim 1, wherein material for said optionally removable non-electrically conductive brittle material is selected from a group consisting of a thermoset insulating material, and a glass reinforced polyester laminate material.

3. The master electrical insulation barrier panel of claim 1, wherein at least one of said knock-out features is selected from a group consisting of a knock-out for a horizontal branch bus, and a knock-out for a power connector.

4. The master electrical insulation barrier panel of claim 1, wherein said master electrical insulation barrier panel is secured as a wall to an electronic apparatus.

5. The master electrical insulation barrier panel of claim 1, wherein said master electrical insulation barrier panel is secured as a wall to an electronic apparatus, and wherein said electronic apparatus is selected from a group consisting of a switchgear, panel board, and circuit breaker.

6. The master electrical insulation barrier panel of claim 1, wherein said master electrical insulation barrier panel has at least one vent opening.

7. The master electrical insulation barrier panel of claim 1, wherein a shape for at least one of said optionally removable knock-out features is selected from a group consisting of a triangular shape, a rectangular shape, a circular shape, a polygonal shape, and an odd shape.

8. A method of forming a master electrical insulation barrier panel having a plurality of optionally removable knock-out features, comprising the steps of:
(a) forming at least one layer of a master electrical insulation barrier panel, wherein said master electrical insulation barrier panel is made from at least one layer of a non-electrically conductive brittle material;
(b) creating a peripheral outline for each of said optionally removable knock-out features in said master electrical insulation barrier panel wherein said peripheral outline defines a shape of an associated knock-out feature to provide a plurality of different shape knock-out features in said master electrical insulation barrier panel, and wherein a location of each of said optionally removable knock-out features corresponds to an optional opening for at least one possible electrical connection;
(c) forming a plurality of interrupted openings along said peripheral outline of said at least one outlined knockout feature location such that said interrupted openings create a breakable weak link between each of said interrupted openings, and wherein at least one of said optionally removable knock-out features is optionally removable to create said optional opening for said at least one possible electrical connection, whereby said master electrical insulation barrier panel can be used in multiple scenarios and applications.

9. The method of claim 8, wherein material for said master electrical insulation barrier panel is selected from a group consisting of a thermoset insulating material, and a glass reinforced polyester laminate material.

10. The method of claim 8, wherein at least one of said optionally removable knock-out features is selected from a group consisting of a knock-out for a horizontal branch bus, and a knock-out for a power connector.

11. The method of claim 8, wherein a shape for at least one of said optionally removable knock-out features is selected from a group consisting of a triangular shape, a rectangular shape, a circular shape, a polygonal shape, and an odd shape.

12. The method of claim 8, wherein said master electrical insulation barrier pane has at least one vent opening.

13. A method of removing optionally removable knockout features from a master electrical insulation barrier panel, comprising the steps of:
(a) forming at least one layer of a master electrical insulation barrier panel, wherein said master electrical insulation barrier panel is made from a non-electrically conductive brittle material;
(b) creating a peripheral outline for each of said optionally removable knock-out features in said master electrical insulation barrier panel wherein said peripheral outline defines a shape of an associated knock-out, feature to provide a plurality of different shape knock-out features in said master electrical insulation barrier, and wherein a location of each of said knock-out features corresponds to an optional opening for at least one possible electrical connection;
(c) forming a plurality of interrupted openings along said peripheral outline for each of said optionally removable knockout features such that said interrupted openings create a breakable weak link between each of said interrupted openings;
(d) applying pressure along a portion of said peripheral outline of at least one selected optionally removable knock-out feature that needs to be removed for creating said optional opening for said at least one possible electrical connection, such that said at least one selected optionally removable knock-out feature separates from said master electrical insulation barrier panel and creates said optional opening for said at least one possible electrical connection and whereby said master electrical insulation barrier panel can be used in multiple scenarios and applications.

14. The method of claim 13, wherein material for said master electrical insulation barrier panel is selected from a group consisting of a thermoset insulating material, and a glass reinforced polyester laminate material.

15. The method of claim 13, wherein at least one of said optionally removable knock-out features is selected from a group consisting of a knock-out for a horizontal branch bus, and a knock-out for a power connector.

16. The method of claim 13, wherein a shape for at least one of said optionally removable knock-out features is selected from a group consisting of a triangular shape, a rectangular shape, a circular shape, a polygonal shape, and an odd shape.

17. The method of claim 13, wherein said master electrical insulation barrier panel has at least one vent opening.

* * * * *